US006311983B1

(12) United States Patent  (10) Patent No.: US 6,311,983 B1
Burcham  (45) Date of Patent: Nov. 6, 2001

(54) COMBINATION STATIC LIFT-OFF FACE CONTACT SEAL AND FLOATING RING SHAFT SEAL

(75) Inventor: Robert E. Burcham, Woodland Hills, CA (US)

(73) Assignee: The Boeing Company, Seal Beach, CA (US)

( * ) Notice: Subject to any disclaimer, the term of this patent is extended or adjusted under 35 U.S.C. 154(b) by 0 days.

(21) Appl. No.: 07/413,650

(22) Filed: Sep. 26, 1989

(51) Int. Cl.[7] ............................... F16J 15/16; F16J 15/38
(52) U.S. Cl. ................. 277/88; 277/88; 277/89; 277/90; 415/113; 415/119
(58) Field of Search ................. 277/88, 89, 90; 415/113, 119

(56) References Cited

U.S. PATENT DOCUMENTS

| 819,635 | * | 5/1906 | Callan ................................ 415/113 |
| 3,874,677 | | 4/1975 | Ludwig et al. ........................ 277/27 |
| 4,099,727 | | 7/1978 | Weiler ................................... 277/3 |
| 4,373,858 | * | 2/1983 | Eastman ............................... 415/113 |
| 4,722,663 | | 2/1988 | Swearingen ....................... 415/169 R |
| 4,738,453 | | 4/1988 | Ide ...................................... 277/81 R |
| 4,744,721 | * | 5/1988 | Villeneuve ............................. 415/113 |

FOREIGN PATENT DOCUMENTS

308722  *  1/1930  (GB) ..................................... 277/88

* cited by examiner

*Primary Examiner*—Charles T. Jordan
*Assistant Examiner*—Lulit Semunegus
(74) *Attorney, Agent, or Firm*—Harry B. Field

(57) ABSTRACT

A rocket engine shaft seal which prevents leakage from escaping from the pump to the turbine along the shaft 1. The seal has a bellows spring 8 for pushing the floating ring seal 2 into contact with the mating ring 4 when the rocket engine is off, thus sealing the liquid in the pump section more reliably. When the engine is on, the pressure of the fuel will overcome the force of the bellows spring 8, moving the floating ring seal 2 away from contact with the mating ring 4, so as to save wear on the face contact portion 5 of the floating ring seal and preserve a good seal when the engine is off. The floating ring seal 2 has an inner diameter 11 for forming a seal with the shaft 1. The shaft 1 may have a labyrinth on it for forming a labyrinth seal with the floating ring seal 2, or with the floating ring seal and the bellows adapter's arm portion 13 for forming a longer labyrinth seal.

9 Claims, 1 Drawing Sheet

COMBINATION STATIC LIFT-OFF FACE CONTACT SEAL AND FLOATING RING SHAFT SEAL

FIELD OF THE INVENTION

This invention relates to a rocket engine turbopump shaft seal; particularly to a combination static lift-off face contact seal and a floating ring shaft seal.

BACKGROUND OF THE INVENTION

In rocket engines it is critical for proper performance that the amount of fuel entering the engine be carefully controlled. Therefore a static face seal is employed around the turbine shaft to prevent fuel leaking into or around the combustion chamber before ignition. Once the engine is started, the static face seal, due to friction, would soon wear out. Therefore, it is removed from contact with the rotating mating ring when the engine starts and is pushed back into contact with the rotating mating ring when the engine is shut down.

A second seal, a floating ring seal, is employed around the turbine shaft to prevent fuel flow-by while the shaft is turning at high speed.

In the past, the static lift-off face seal and its mechanism for movement and the floating seal ring were separate more complex units.

SUMMARY OF THE INVENTION

The present invention combines the static lift-off face seal and the floating ring seal into one part. When the engine is turned on, the pressure of the fuel in the pump pushes the face seal portion of the floating ring seal away from contact with the rotating mating ring. The face seal portion of the floating ring seal is returned to contact with the rotating mating ring by a bellows spring to seal the fuel from leaking when the engine is off.

Combining the face seal and the floating ring seal in one unit, and using the pressure of the fuel to move the unit reduces the complexity of the turbopump, and reduces its cost.

DETAILED DESCRIPTION OF THE PREFERRED EMBODIMENT

In rocket engines, particularly those powered by a liquid fuel such as hydrogen, it is extremely important to control the leakage of fuel along the shaft between the pump and the turbine. In order to control the leakage of fuel, various seals have been developed to prevent leaks which can result in wasted fuel, improper ignition, uneven engine performance or explosions.

Figure 1:
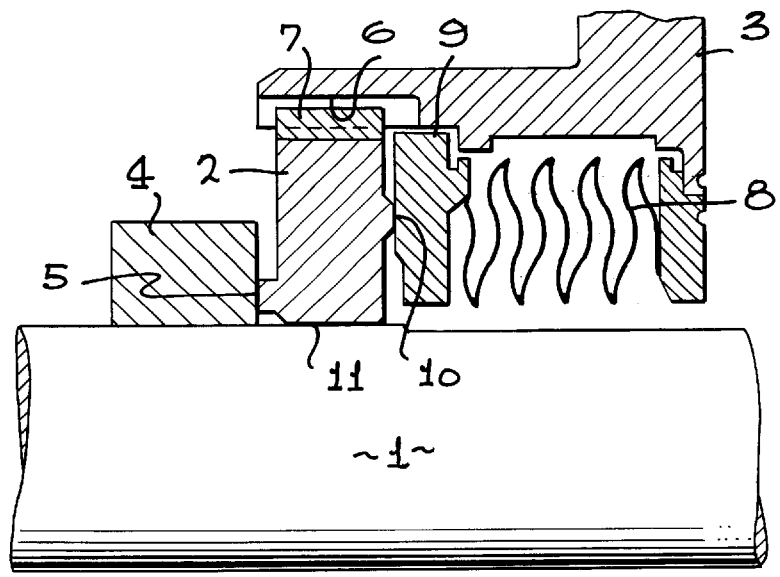
FIG. 1 shows a cross sectional side schematic view of the invention.

Referring to the drawings, FIG. 1 shows a cross sectional view of the floating ring seal 2 on shaft 1. The shaft 1 extends between the pump and the turbine in a rocket engine. Floating seal ring 2 is a dual purpose seal, designed to prevent fuel leakage along the shaft 1 when the engine is on and along the mating ring 4 when the engine is off.

There is a mating ring 4 on shaft 1. When the engine is off, the face contact portion 5 of the floating ring seal 2 is in contact with the mating ring 4. Floating ring seal 2 is slideable in seal housing 3. It also provides a stop for limiting the movement of the floating ring seal.

Seal housing 3 has a slot 6 which allows anti-rotation tang 7 to slide back and forth in the housing. There are preferably three anti-rotation tangs on floating seal ring 2.

The floating seal ring 2 is pushed forward so that the face contact portion 5 is forced snuggly against the mating ring 4 by bellows spring 8.

The bellows spring 8 is retained in seal housing 3. It is composed of a series of formed washers welded at the inside diameter and the outside diameter so that no fuel will escape through the welds. The shaft 1, passes through the center of the washers. The bellows spring 8 is connected to a bellows end fitting 9 which pushes against the static face seal portion 10 of floating ring seal 2, preventing leakage from escaping to the shaft area from around the tang area.

The floating ring seal 2 has an inside diameter 11, which is close fitting to shaft 1. The inside diameter has preferably 2 to 3 thousandths of an inch clearance to the shaft to provide a seal which prevents leakage along the shaft. Since the shaft turns at approximately 30,000 RPM when the engine is on, the clearance is needed to avoid excessive wear on the seal.

The small clearance allows some fuel from the high pressure pump side to leak to the low pressure turbine side thus permitting the floating ring seal to float on a thin layer of fuel. This reduces the frictional wear between the floating ring seal and the shaft.

When the engine is on, the pressure of the liquid fuel from the pump will push the floating ring seal 2 to the right overcoming the force applied by the bellows spring 8, and forcing the floating seal ring 2 to the right. The face contact portion 5 of floating ring seal 2 is thereby separated from rubbing contact with the rotating mating ring 4. This allows for a longer life on the face contact portion 5 and in an engine which repeatedly starts and stops, allows a better seal at this position when the engine is off, thus improving the safety of the engine and saving fuel.

Figure 2:
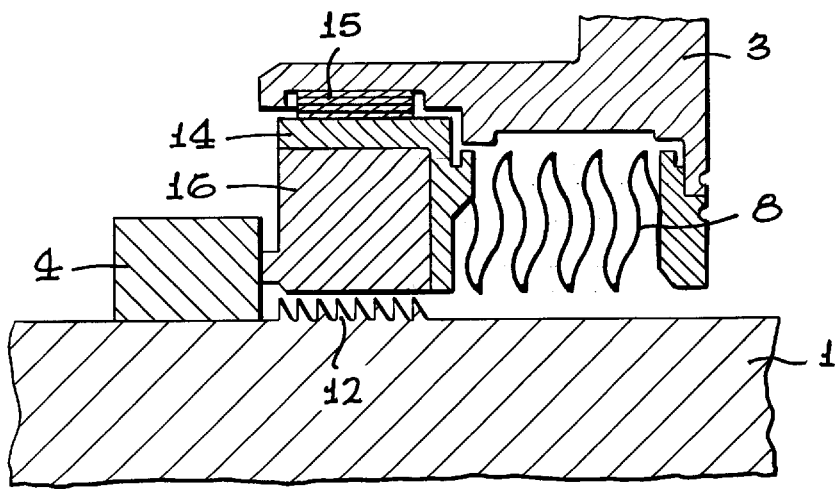
FIG. 2 shows a cross sectional side schematic view of an alternative labyrinth configuration of the invention.

In a second embodiment as shown in FIG. 2, a labyrinth seal is employed along shaft 1. The labyrinth seal is formed by a labyrinth 12 on shaft 1, extending essentially the length of the seal ring 16. In this embodiment, the bellows spring 8 is attached to a bellows adapter 14, which is attached to the seal ring 16.

Figure 3:
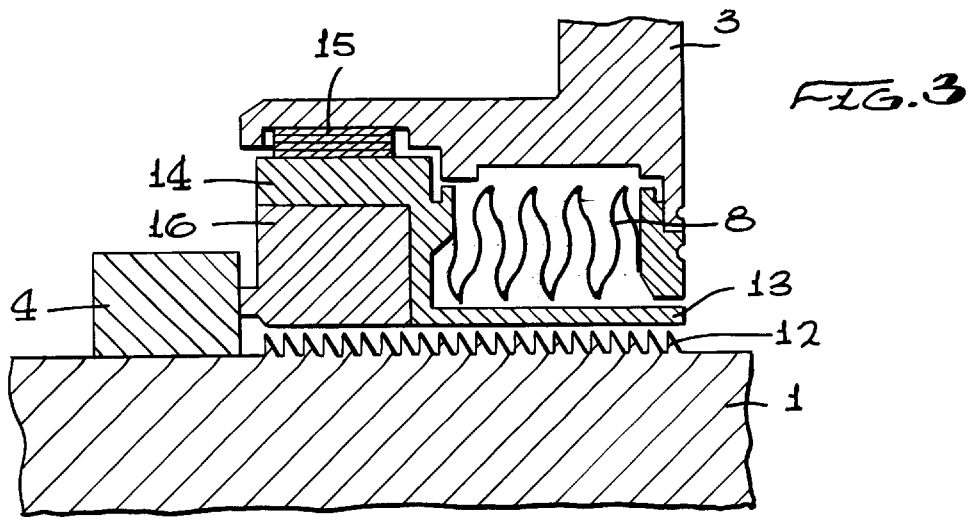
FIG. 3 shows a second alternative labyrinth configuration of the invention.

In a third embodiment as shown in FIG. 3, the design of FIG. 2 is modified to extend the labyrinth 12 further along the shaft 1 toward the turbine and the bellows adapter 14 has an arm portion 13 extending over the additional length of the labyrinth 12 on shaft 1. This extends the length of the labyrinth seal and reduces the leakage.

In the embodiments as shown in FIGS. 2 and 3 there is a wave spring vibration damper 15. No anti-rotation tangs 7 are used as in FIG. 1.

What is claimed and desired to be secured by Letters Patent of the United States is:

1. A floating ring seal for a turbine shaft comprising;
   a seal housing containing a bellows spring,
   a shaft having a mating ring, the shaft extending through the seal housing,
   a bellows end fitting attached to the bellows spring,
   a floating ring seal, having a face contact seal portion, said floating ring seal is slidable on the shaft and placed between the mating ring and the bellows end fitting, the face contact seal portion abutting the mating ring when the bellows spring is fully extended to form a static seal, the floating ring seal having an inner diameter which forms a seal along the shaft.

2. A floating ring seal as in claim 1 where the shaft housing has a slot for receiving an anti-rotation tang on the floating ring seal, the slot having a length allowing the floating ring seal to move along the shaft.

3. A floating ring seal as in claim 1 where the floating ring seal has a face seal portion for making seal contact with the bellows end fitting.

4. A seal ring for a turbine shaft comprising;

a seal housing containing a bellows spring, a shaft having a mating ring, the shaft extending through the seal housing, a bellows adapter attached to the bellows spring, a seal ring attached to the bellows adapter, the seal ring is slidable on the shaft and makes a sealing contact with the mating seal ring when the bellows spring is extended, the shaft having a labyrinth for forming a labyrinth seal with an inner diameter of the seal ring.

5. A seal ring for a shaft as in claim 4 where the bellows adapter has an arm extending along the shaft, and the shaft has a labyrinth extending the length of the seal ring and the length of the bellows adapter arm for forming a labyrinth seal.

6. A seal ring for a shaft as in claim 4 where the seal housing has a wave spring vibration damper on the seal ring.

7. A seal ring for a shaft as in claim 4 where the seal ring has a face contact portion for making sealing contact with the mating ring.

8. A seal ring for a shaft as in claim 5 where the seal housing has a wave spring vibration damper on the seal ring.

9. A seal ring for a shaft as in claim 5 where the seal ring has a face contact portion for making sealing contact with a mating ring.

* * * * *